United States Patent
Huck

(10) Patent No.: US 9,976,333 B2
(45) Date of Patent: May 22, 2018

(54) ADJUSTING DRIVE, IN PARTICULAR WINDOW LIFTER DRIVE

(75) Inventor: Thomas Huck, Rheinmuenster (DE)

(73) Assignee: Robert Bosch GmbH, Stuttgart (DE)

( * ) Notice: Subject to any disclaimer, the term of this patent is extended or adjusted under 35 U.S.C. 154(b) by 1442 days.

(21) Appl. No.: 13/582,519

(22) PCT Filed: Jan. 3, 2011

(86) PCT No.: PCT/EP2011/050005
§ 371 (c)(1),
(2), (4) Date: Nov. 12, 2012

(87) PCT Pub. No.: WO2011/107300
PCT Pub. Date: Sep. 9, 2011

(65) Prior Publication Data
US 2013/0057122 A1  Mar. 7, 2013

(30) Foreign Application Priority Data
Mar. 2, 2010 (DE) .................. 10 2010 002 511

(51) Int. Cl.
*H02K 11/00* (2016.01)
*H02K 5/22* (2006.01)
(Continued)

(52) U.S. Cl.
CPC .......... *E05F 15/697* (2015.01); *H02K 5/225* (2013.01); *H02K 11/215* (2016.01);
(Continued)

(58) Field of Classification Search
CPC .......................... H02K 5/225; H02K 15/0062
(Continued)

(56) References Cited

U.S. PATENT DOCUMENTS 6,107,713 A * 8/2000 Hulsmann et al. .......... 310/75 R
6,317,332 B1 * 11/2001 Weber et al. ................ 361/760
(Continued)

FOREIGN PATENT DOCUMENTS

CN         1774853       5/2006
DE       102005055740    6/2006
(Continued)

OTHER PUBLICATIONS

"Along." Dictionary.com Unabridged. Random House, Inc. Jul. 22, 2015. <Dictionary.com http://dictionary.reference.com/browse/along>.*
(Continued)

*Primary Examiner* — Thomas Truong
(74) *Attorney, Agent, or Firm* — Michael Best & Friedrich LLP

(57) ABSTRACT

The invention relates to an adjusting drive (1) comprising an electric motor (2), an output shaft (3), a printed circuit board (4), a housing (6) and a connection interface (5), wherein the electric motor (2) is contacted with the printed circuit board (4) and is designed to drive the output shaft (3), wherein the housing (6) accommodates the printed circuit board (4), wherein the connection interface (5) comprises a direct plug connection with contacting pads (9) directly on the printed circuit board (4), and wherein the contacting pads (9) are designed for direct contact with a connector (7), wherein the connection interface (5) comprises a housing opening (8) in the housing (6) as access for the connector to the contacting pads (9), and wherein the printed circuit board (4) is dimensioned to be narrower than the housing opening (8) such that the printed circuit board (4) can be inserted through the housing opening (8) into the housing (6).

2 Claims, 5 Drawing Sheets

(51) Int. Cl.
  *H02K 15/00* (2006.01)
  *E05F 15/697* (2015.01)
  *H02K 11/215* (2016.01)
  *H02K 7/116* (2006.01)

(52) U.S. Cl.
  CPC ...... *H02K 15/0062* (2013.01); *E05Y 2900/55* (2013.01); *H02K 7/1166* (2013.01); *H02K 2211/03* (2013.01)

(58) Field of Classification Search
  USPC .......................... 310/68 R, 71, 75 R; 29/596
  See application file for complete search history.

(56) References Cited

U.S. PATENT DOCUMENTS

| | | | |
|---|---|---|---|
| 6,759,783 B2 * | 7/2004 | Hager et al. | 310/239 |
| 6,903,473 B2 * | 6/2005 | Matsuyama et al. | 310/71 |
| 6,906,438 B2 * | 6/2005 | Ursel et al. | 310/89 |
| 7,183,682 B2 * | 2/2007 | Yamashita et al. | 310/75 R |
| 7,602,090 B2 * | 10/2009 | Huck et al. | 310/71 |
| 2002/0149283 A1 | 10/2002 | Hager et al. | |

FOREIGN PATENT DOCUMENTS

| | | |
|---|---|---|
| DE | 20023851 | 11/2006 |
| WO | 2009/098076 | 8/2009 |

OTHER PUBLICATIONS

PCT/EP2011/050005 International Search Report dated Apr. 11, 2011 (6 pages).

* cited by examiner

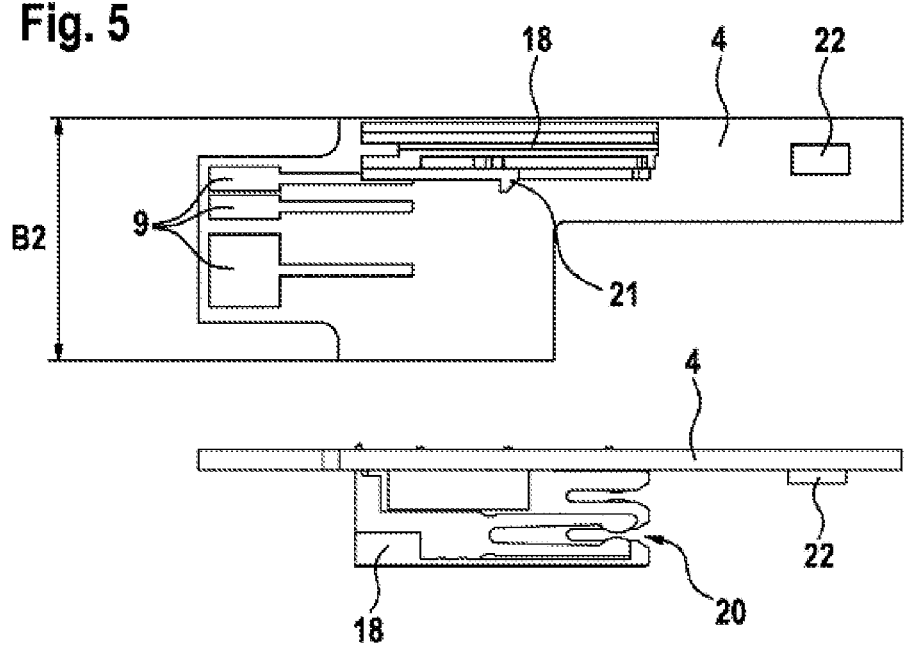
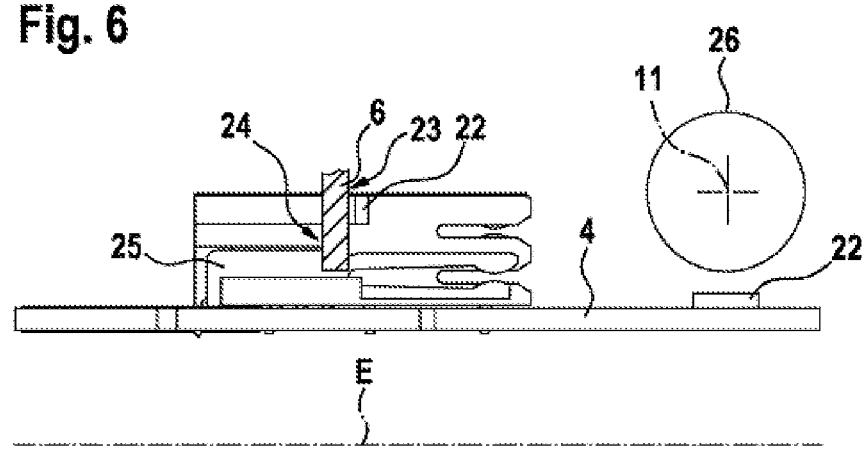

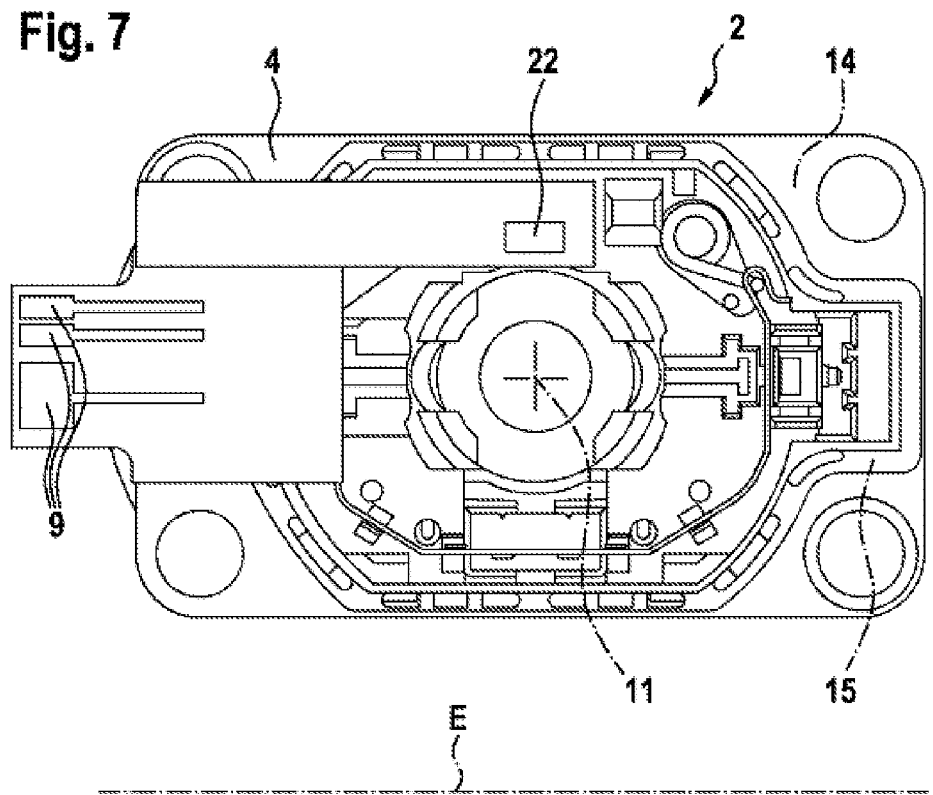

ADJUSTING DRIVE, IN PARTICULAR WINDOW LIFTER DRIVE

BACKGROUND OF THE INVENTION

The present invention relates to an adjusting drive, in particular for application as window lifter drive in a motor vehicle.

In the prior art, window lifter drives with electronic circuit boards are known, wherein different functionalities are implemented in these drives such as, for example, a clamping protection function. To link the window lifter drives to customer, i.e. vehicle interfaces, the housings of these drives have connector carriers. In these connector carriers, connector pins or spring contacts are constructed at the drive side. These connector pins are soldered onto the circuit board of the window lifter drive or pressed in. The interface at the window lifter drive side is thus formed by protruding pins. In this arrangement, the circuit boards are installed in parallel or perpendicularly to a screwing plane of the window lifter drive. The window lifter drives according to the prior art comprise a housing with a lid component. When the lid is open, the circuit board can be inserted into the housing and the housing can subsequently be closed by means of the lid.

SUMMARY OF THE INVENTION

The adjusting drive according to the invention makes it possible to dispense with additional housing or lid components especially due to an especially advantageous design of the circuit board size. In addition, the central position of the circuit board within the connector shroud and the positioning of the connector shroud in the generally accessible construction space provides for the application of a direct plug-in connection. Dispensing with connector pins on the drive side leads in this contacting concept to significant cost savings in tools and individual parts. In addition, the significantly more simple housing design, especially without the connector pins, has advantages in the flexible design of the drive housing tools with regard to the implementation of various connector designs. A further purpose is the shortening of the tool production times for the drive housings. This, in turn, leads to a shortening of the development period. Using small circuit board sizes enables these circuit boards to be inserted into the housing through the connector shroud as a result of which additional housing and lid components can be omitted. All these advantages are achieved by the adjusting drive according to the invention, comprising an electric motor, especially a DC motor, an output shaft, a circuit board, a housing and a connection interface, wherein the electric motor is contact-connected to the circuit board and designed for driving the output shaft, wherein the housing accommodates the circuit board, wherein the connection interface comprises a direct plug-in connection to contacting pads directly on the circuit board and wherein the contacting pads are designed for direct contact with a connector. Furthermore, the connection interface comprises a housing opening in the housing as access for the connector to the contacting pads, wherein the circuit board is dimensioned to be narrower than the housing opening so that the circuit board can be inserted into the housing through the housing opening. The contacting pads of the circuit board are designed especially in such a manner that they are designed for direct contact with spring contacts of a connector. In particular, the novel, small circuit board can be equipped with particularly small sensor circuit boards.

In an advantageous embodiment, it is provided that the circuit board comprises a first locking device and the housing comprises a second locking device complementary to the first locking device, and/or that the circuit board comprises a stop for the defined positioning of the circuit board in the housing. It is provided particularly advantageously that the circuit board comprises a mounted holder, especially of plastic, wherein the first locking device and/or the stop are formed on the holder. The electric motor preferably comprises two pins, wherein the circuit board advantageously comprises a motor contact-connection device, especially forked contact connection device, which can be plugged onto both pins. This motor contact-connection device is advantageously formed on the holder, together with the first locking device and/or the stop. The forked contact connection device is preferably soldered to the circuit board or contact-connected by pressure application. By means of particularly advantageous contouring, the holder, together with the fork contacts, can be cost effectively soldered together with the electronic components in a reflow process of the circuit board production. The motor contact-connection device is needed for establishing the electrical contact-connection from the connection interface to the carbon brushes of the DC motor.

Furthermore, it is preferred that the housing opening opens perpendicularly to an armature axis of the electric motor and the circuit board can be pushed in perpendicularly to the armature axis. This perpendicular insertion with respect to the armature axis relates to the direction of inserting. As will be shown later, the circuit board itself can be arranged in parallel, obliquely or perpendicularly to a plane which is perpendicular to the output shaft of the adjusting drive.

Furthermore, it is of advantage that the connection interface comprises a connector shroud on an outside of the housing and around the housing opening, the connector shroud extending no further than the housing itself in the direction of the output shaft and the contacting pads being arranged centrally with respect to the connector shroud. This relatively narrow design of the connector shroud ensures that the adjusting drive, especially window lifter drive, fits into the available construction space. In order to implement a contact-connection of the circuit board to a connector, for example in the vehicle network, the circuit board is preferably positioned approximately centrally with respect to the connector shroud. Since the adjusting drive according to the invention dispenses with connector pins, the spring contacts at the connector must rest on the contacting pads of the circuit board. This type of contacting is called direct plug-in connection.

Furthermore, it is of advantage that the electric motor comprises a brush carrier and a pole housing, the brush carrier being inserted into the pole housing and the pole housing being joined to the brush carrier outside the housing. The housing of the adjusting drive thus takes up a part of the electric motor.

In a preferred embodiment, it is provided that a transmitter magnet is located on the armature axis of the electric motor, the transmitter magnet interacting with a Hall sensor on the circuit board. In consequence, the circuit board is designed in such a manner that it extends over or under the armature axis with the Hall sensor. By this means, angle of rotation or speed of the electric motor can be detected.

In an especially advantageous embodiment, the circuit board is arranged at an angle $\alpha$ obliquely to a plane which is perpendicularly to the output shaft. In this arrangement, the angle is selected in such a manner that the contacting pads are located centrally in the housing opening. This makes it possible that, on the one hand, the Hall sensor on the circuit board is sitting above or below the armature axis of the electric motor and, on the other hand, the contacting pads are arranged within the available construction space centrally in the connector shroud.

In an especially advantageous embodiment, the armature axis of the electric motor is perpendicular to the output shaft of the adjusting drive according to the invention, wherein the angle α of the circuit board is 1 to 15 degrees, preferably 10 degrees so that an extent of housing and electric motor in the direction of the output shaft is as small as possible. This is particularly important when using the adjusting drive according to the invention as window lifter drive since in this case only the small construction space within a vehicle door is available.

In an alternative embodiment, it is provided that the circuit board is arranged perpendicularly to the plane which is perpendicular to the output shaft. This means that, although the circuit board is still inserted in a direction perpendicular to the armature axis of the electric motor, the circuit board is then perpendicular to this plane. In this context, in particular, Hall sensors of very small construction must be used in order to not expand the available construction space.

The invention also comprises a window lifter drive for application in a motor vehicle, comprising an adjusting drive as has just been described, and a connector with protruding spring contacts, wherein the spring contacts protrude into the adjusting drive and are in direct contact with the contacting pads. The advantageous embodiments described in the context of the adjusting drive according to the invention naturally find correspondingly advantageous application on the window lifter drive according to the invention.

The invention also comprises a method for assembling an adjusting drive, comprising the following steps: providing a housing having a housing opening, inserting a circuit board into the housing opening, the circuit board being dimensioned to be narrower than the housing opening, and mounting an electric motor before or after inserting the circuit board at and/or in the housing, the electric motor being contact-connected to the circuit board, wherein at the adjusting drive, a connection interface is formed which comprises a direct plug-in connection to contacting pads directly on the circuit board, the contacting pads being designed for direct contact with spring contacts of a connector, and the housing opening, as component of the connection interface, acts as access for the connector to the contacting pads. Thus, one and the same opening is used both for inserting the circuit board into the housing and for plugging-in the connector. As a result, an additional lid on the housing for mounting the circuit board can be omitted. The advantageous embodiments described in the context of the adjusting drive according to the invention find correspondingly advantageous applications to the method according to the invention for assembly of the adjusting drive.

BRIEF DESCRIPTION OF THE DRAWINGS

In the text which follows, two exemplary embodiments of the invention will be described in detail with reference to the accompanying drawing, in which:

FIG. 5 shows a second detailed view of the circuit board of the adjusting drive according to the first exemplary embodiment, FIG. 6 shows a third detailed view of the circuit board of the adjusting drive according to the first exemplary embodiment, and FIG. 7 shows an adjusting drive according to a second exemplary embodiment.

DETAILED DESCRIPTION

In the text which follows, a first exemplary embodiment of the invention is explained in greater detail with reference to FIGS. 1 to 6.

Figure 1:
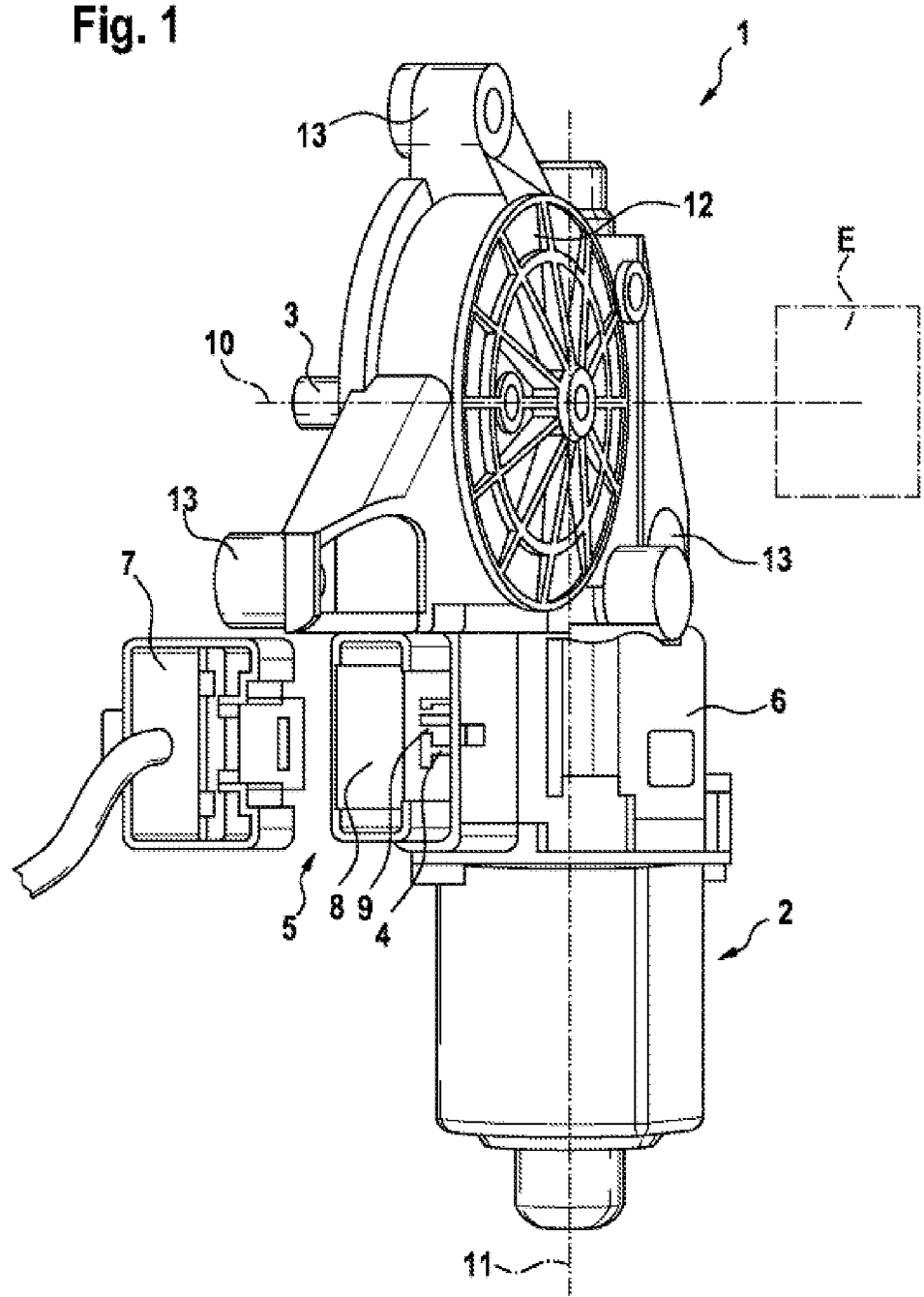
FIG. 1 shows an adjusting drive according to a first exemplary embodiment.

FIG. 1 shows an adjusting drive 1 according to the first exemplary embodiment, comprising an electric motor 2, an output shaft 3, a circuit board 4, a housing 6 and a connection interface 5.

The electric motor comprises an armature axis 11. It is not shown how the electric motor 2 drives a worm gear. This worm gear, in turn, engages a corresponding worm wheel. The worm wheel drives the output shaft 3. As a result, an output axis 10 of the output shaft 3 is perpendicular to the armature axis 11 of the electric motor 2. A plane E is perpendicular to the output shaft 3 or the corresponding output axis 10. As an alternative, output can also be effected via a catch.

The housing 6 comprises a gear case part 12. This gear case part 12 accommodates a gear unit consisting of the worm shaft and the worm wheel. At the gear case part 12, three bolt-on positions 13 are provided. By means of these three bolt-on positions 13, the entire adjusting drive 1 can be mounted, for example, in a vehicle door.

A part of the housing 6 forms, together with a part of the circuit board 4, the connection interface 5. This connection interface 5 comprises a housing opening 8. In the center of this housing opening 8, contacting pads 9 are arranged on the circuit board 4. Due to this central arrangement, the contacting pads 9 are freely accessible for spring contacts within a connector 7.

Figure 2:
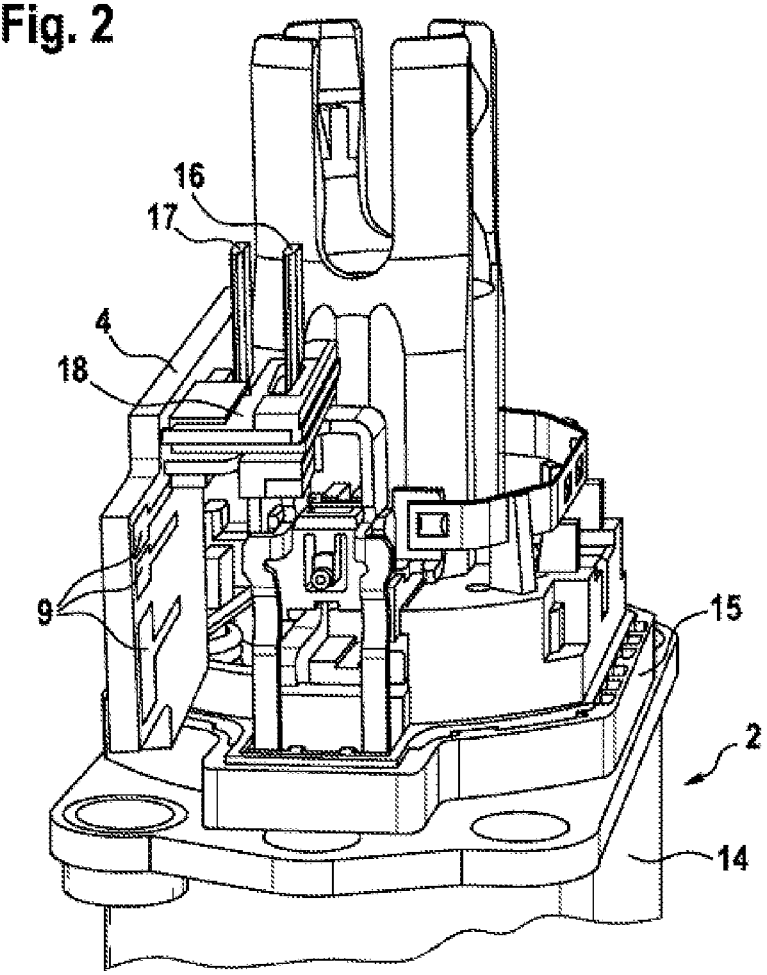
FIG. 2 shows a detail view of the electric motor with circuit board of the adjusting drive according to the first exemplary embodiment.
Figure 2:
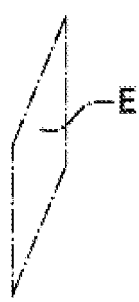

FIG. 2 shows in detail the structure of the electric motor 2 and its contact-connection by the circuit board 4 without the gear case. The electric motor 2 comprises a pole pot 14 and a brush carrier 15. The pole pot 14 is flanged to the housing 6 on the outside. The brush carrier 15 protrudes into the housing 6. The electric motor 2 comprises at the brush carrier 15 a first pin 16 and a second pin 17. The first and second pin 16, 17 extend in the direction of the armature axis 11.

Figure 4:
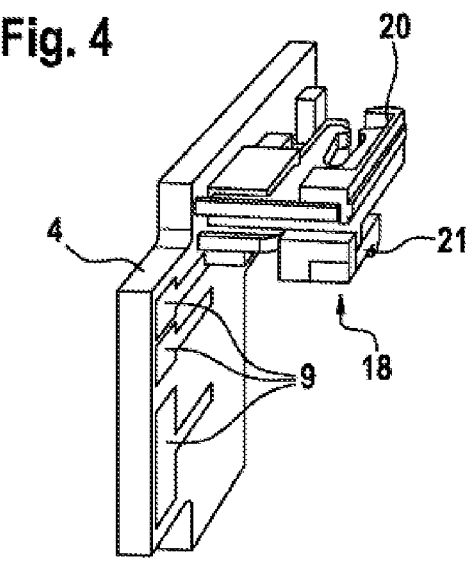
FIG. 4 shows a first detailed view of the circuit board of the adjusting drive according to the first exemplary embodiment.

The circuit board 4 comprises a holder 18 which is pushed onto the first and second pin 16, 17. By this means, the electric motor 2 is contact-connected. FIGS. 4 to 6 show the precise structure of the holder 18 on the circuit board 4.

Figure 3:
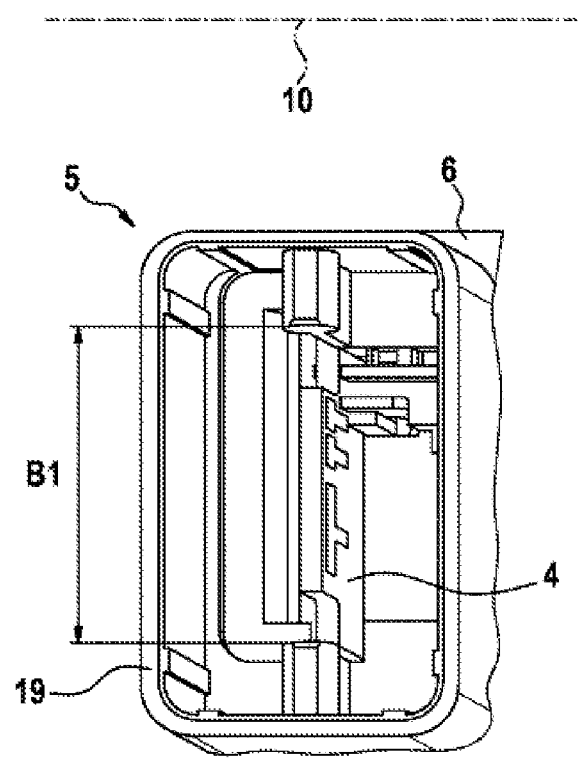
FIG. 3 shows a connection interface of the adjusting drive according to the first exemplary embodiment.

FIG. 3 shows the connection interface 5 in detail. This shows well how the connection interface 5 comprises a connector shroud 19. This connector shroud 19 is an integral component of the housing 6 and protrudes outward. The connector shroud 19 does not extend further than the entire housing 6 in a direction parallel to the output axis 10. This ensures the narrowest possible construction of the entire adjusting drive 1. Furthermore, FIG. 3 shows a width B1 of the housing opening 8. As will be seen by means of FIG. 5, the circuit board 4 only extends by a width B2. In this arrangement, the first width B1 is greater than the second width B2. This ensures that the circuit board 4 can be mounted through the housing opening 8. Additional lid components at the housing 6 can thus be omitted.

FIGS. 4 to 6 show the circuit board 4 in detail. It can be seen how the holder 18, as a plastic part, is placed onto the circuit board 4. Within or on the holder 18, a motor contact-connection device formed as forked contact-connection device 20 is formed. This forked contact-connection device 20 comprises two slot-shaped openings. These two slot-shaped openings are pushed onto the first and second pin 16, 17 of the electric motor 2. As a result, the circuit board 4 can be pushed into the housing 6 with preassembled electric motor 2 without soldering the circuit board 4 to the electric motor 2. To transmit the electricity from the circuit board 4 via the holder 18 to the first and second pins 16, 17 of the electric motor 2, there are conductor strips 25 within the forked contact-connection 20.

Furthermore, a first locking device 21 is formed on the holder 18. This first locking device 21 is constructed as detent as shown in FIG. 5. FIG. 6 again shows how this first locking device 21 interacts with a second locking device 22 on the housing 6. In addition, the holder 18 comprises a stop 24. With the circuit board 4 assembled, the second locking device 23, as part of the housing 6, is located between the first locking device 21 and the stop. This ensures a defined position of the entire circuit board 4. Furthermore, a Hall sensor 22 is formed on the circuit board 4. Correspondingly, there is a transmitter magnet 26 on the armature axis 11. The Hall sensor 22 is brought into a precise position with respect to the transmitter magnet 26 by means of the first and second locking device 21, 23 and the stop 24. In order to keep the entire construction space as small as possible, the circuit board 4 is slightly slanted so that the contacting pads 9 are located centrally within the connector shroud 19.

By means of this exemplary embodiment, it has been shown how due to the advantageous dimensioning of the circuit board 4, the latter can be assembled through the housing opening 8. This housing opening 8 is used, at the same time, as connection interface for the connector 7. As a result, the lid components can be omitted which enable the circuit board to be assembled in conventional adjusting drives. In addition, the circuit board 4 can be brought into contact with the electric motor 2 in a very simple and fast manner by means of the motor contact-connection device 20 designed in accordance with the invention. It is not necessary, therefore, to provide an access for soldering circuit board 4 to electric motor 2 via lid components.

FIG. 7 shows a second exemplary embodiment of the adjusting drive 1. Identical or functionally identical components are designated by the same reference symbol in both exemplary embodiments. In both exemplary embodiments, the circuit board 4 is pushed in perpendicularly to the armature axis 11 of the electric motor 2 during the assembly. In the first exemplary embodiment, the circuit board 4 is then arranged in parallel or slightly obliquely at an angle of between 1 to 15 degrees to the plane E. In the second exemplary embodiment, in contrast, the circuit board 4 is arranged perpendicularly to the plane E. An L-shaped design of the circuit board 4 in this arrangement can ensure that the part of the circuit board 4 on which the Hall sensor 22 is located can be positioned above or below the armature axis 11. In this context, Hall sensors 22 of very small construction are applied, in particular.

What is claimed is:

1. A method for assembling an adjusting drive (1) comprising the following steps:
   providing a housing (6) having a housing opening (8),
   inserting a circuit board (4) into the housing opening (8) along a first direction, wherein the entire circuit board (4) is narrower than the housing opening (8), and
   mounting an electric motor (2) to the housing (6) before or after inserting the circuit board (4),
   wherein the electric motor (2) is contact-connected to the circuit board (4),
   wherein at the adjusting drive (1), a connection interface (5) is formed which comprises a direct plug-in connection to contacting pads (9) directly on the circuit board (4),
   wherein the contacting pads (9) are designed for direct contact with spring contacts of a connector (7),
   wherein the connection interface (5) includes the housing opening (8) and the contact pads (9) are exposed in the housing opening (8),
   wherein the method includes inserting a portion of the connector (7) into the assembled adjusting device (1) along the first direction into the housing opening (8) to directly contact the contacting pads (9), and wherein at the time of inserting the portion of the connector (7) along the first direction into the housing opening (8), the entire housing opening (8) is exposed along an exterior of the adjusting drive (1).

2. The method of claim 1, further comprising both removing the connector (7) from the housing (6) through the housing opening (8) along a direction opposite to that of the first direction and removing the circuit board (4) from the housing (6) through the housing opening (8) along the direction opposite that of the first direction, without having to first remove or disassemble any other component of the adjusting drive.

* * * * *